United States Patent
Phelps

(10) Patent No.: US 6,713,601 B2
(45) Date of Patent: *Mar. 30, 2004

(54) SPECIES MODIFICATION IN MACROCYCLIC POLYESTER OLIGOMERS, AND COMPOSITIONS PREPARED THEREBY

(75) Inventor: Peter D. Phelps, Schenectady, MA (US)

(73) Assignee: Cyclics Corporation, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/161,577

(22) Filed: Jun. 3, 2002

(65) Prior Publication Data

US 2003/0096943 A1 May 22, 2003

Related U.S. Application Data

(63) Continuation of application No. 09/659,975, filed on Sep. 12, 2000, now Pat. No. 6,436,548.

(51) Int. Cl.[7] .................................................. C08F 6/00
(52) U.S. Cl. ........................ 528/503; 525/437; 525/444; 524/779; 524/780; 524/789; 428/480; 528/491
(58) Field of Search ................................. 525/437, 444; 524/779, 780, 789; 428/480; 528/491, 503

(56) References Cited

U.S. PATENT DOCUMENTS

| | | | |
|---|---|---|---|
| 2,628,171 A | 2/1953 | Green ........................ 106/271 |
| 3,018,272 A | 1/1962 | Griffing et al. | |
| 3,786,067 A | 1/1974 | Throckmorton et al. .... 260/327 |
| 4,590,259 A | 5/1986 | Kosky et al. ............... 528/272 |
| 4,605,731 A | 8/1986 | Evans et al. ................ 528/371 |
| 4,616,077 A | 10/1986 | Silva .......................... 528/371 |
| 4,638,077 A | 1/1987 | Brunelle et al. ............ 558/281 |
| 4,644,053 A | 2/1987 | Brunelle et al. ............ 528/371 |
| 4,680,345 A | 7/1987 | Kobayashi et al. ......... 525/437 |
| 4,727,134 A | 2/1988 | Brunelle et al. ............ 528/371 |
| 4,740,583 A | 4/1988 | Brunelle et al. ............ 528/370 |
| 4,757,132 A | 7/1988 | Brunelle et al. ............ 528/357 |

(List continued on next page.)

FOREIGN PATENT DOCUMENTS

| | | |
|---|---|---|
| BE | 676324 | 6/1966 |
| CH | 654 304 A5 | 2/1986 |
| CN | 1120555 | 4/1996 |

(List continued on next page.)

OTHER PUBLICATIONS

Beach, A. Christopher G. "The Preparation of Mirrors by Sputtering Metals onto Glass Surfaces," *A. Inst. P.*, Chelsea Polytechnic, M.S. received, Mar. 17, 1930.

(List continued on next page.)

*Primary Examiner*—Samuel A. Acquah
(74) *Attorney, Agent, or Firm*—Testa, Hurwitz & Thibeault, LLP

(57) ABSTRACT

Physical properties, such as melting temperature of MPO compositions may be significantly modified by modifying the weight percentage of one or more of the constituent MPOs. For example, removal of a significant portion of the tetramer can afford low melting MPO compositions. In one aspect, the invention is related to a method for modifying a physical property of a MPO composition that includes the steps of (a) providing a composition that has at least two species of MPOs, and (b) changing the weight percentage of at least one species of the MPOs in the composition. In another aspect, the invention is related to a MPO composition that includes at least two species of MPOs where a species of the MPOs having the highest melting temperature is present in an amount less than or equal to 5%. In yet another aspect, the invention is related to a MPO composition comprising 30–40% macrocyclic polyester dimers, 30–45% macrocyclic polyester trimers, 0–5% macrocyclic polyester tetramers, and 5–20% macrocyclic polyester pentamers.

18 Claims, 1 Drawing Sheet

U.S. PATENT DOCUMENTS

| | | | |
|---|---|---|---|
| 4,785,060 A | 11/1988 | Nagler | 525/444 |
| 4,803,288 A | 2/1989 | Kitamura et al. | 549/267 |
| 4,816,548 A | 3/1989 | Evans et al. | 528/370 |
| 4,829,144 A | 5/1989 | Brunelle et al. | 528/176 |
| 4,831,001 A | 5/1989 | Evans et al. | 502/153 |
| 4,888,411 A | 12/1989 | Shannon et al. | 528/199 |
| 4,904,810 A | 2/1990 | Brunelle et al. | 558/281 |
| 4,980,453 A | 12/1990 | Brunelle et al. | 528/352 |
| 4,992,228 A | 2/1991 | Heck et al. | 264/135 |
| 4,999,420 A | 3/1991 | Leitz et al. | 528/371 |
| 5,006,637 A | 4/1991 | Guggenheim et al. | 528/355 |
| 5,023,346 A | 6/1991 | Schon et al. | 549/231 |
| 5,039,717 A | 8/1991 | Kawakami et al. | 523/100 |
| 5,039,783 A | 8/1991 | Brunelle et al. | 528/272 |
| 5,071,711 A | 12/1991 | Heck et al. | 428/542.8 |
| 5,095,088 A | 3/1992 | Wang | 528/203 |
| 5,097,008 A | 3/1992 | Krabbenhoft et al. | 528/371 |
| 5,116,900 A | 5/1992 | Flautt et al. | 524/377 |
| 5,191,013 A | 3/1993 | Cook et al. | 524/601 |
| 5,191,038 A | 3/1993 | Krabbenhoft et al. | 525/462 |
| 5,207,850 A | 5/1993 | Parekh | 156/166 |
| 5,214,158 A | 5/1993 | Brunelle et al. | 549/267 |
| 5,225,129 A | 7/1993 | van den Berg | 264/85 |
| 5,231,161 A | 7/1993 | Brunelle et al. | 528/272 |
| 5,237,042 A | 8/1993 | Kim et al. | 528/279 |
| 5,241,880 A | 9/1993 | Mizobata et al. | 74/502.5 |
| RE34,431 E | 11/1993 | Brunelle et al. | 528/352 |
| 5,264,548 A | 11/1993 | Brunelle et al. | 528/370 |
| 5,281,669 A | 1/1994 | Kambour et al. | 525/177 |
| 5,288,837 A | 2/1994 | Munjal et al. | 528/198 |
| 5,300,392 A | 4/1994 | Odell et al. | 430/130 |
| 5,300,393 A | 4/1994 | Odell et al. | 430/134 |
| 5,300,590 A | 4/1994 | Cook et al. | 525/444 |
| 5,302,484 A | 4/1994 | Odell et al. | 430/127 |
| 5,314,779 A | 5/1994 | Odell et al. | 430/134 |
| 5,321,117 A | 6/1994 | Brunelle | 528/272 |
| 5,340,909 A | 8/1994 | Doerr et al. | 528/276 |
| 5,348,985 A | 9/1994 | Pearce et al. | 521/124 |
| 5,356,984 A | 10/1994 | Carbone et al. | 524/431 |
| 5,386,037 A | 1/1995 | Takekoshi et al. | 549/206 |
| 5,387,666 A | 2/1995 | Takekoshi et al. | 528/283 |
| 5,389,719 A | 2/1995 | Takekoshi et al. | 524/784 |
| 5,407,984 A | 4/1995 | Brunelle et al. | 524/178 |
| 5,410,014 A | 4/1995 | Haese et al. | 528/196 |
| 5,420,226 A | 5/1995 | Hamer et al. | 528/201 |
| 5,434,244 A | 7/1995 | Warner et al. | 528/490 |
| 5,446,122 A | 8/1995 | Warner et al. | 528/279 |
| 5,466,744 A | 11/1995 | Evans et al. | 524/714 |
| 5,498,651 A | 3/1996 | Brunelle | 524/176 |
| 5,527,976 A | 6/1996 | Takekoshi et al. | 585/16 |
| 5,530,052 A | 6/1996 | Takekoshi et al. | 524/447 |
| 5,591,800 A | 1/1997 | Takekoshi et al. | 524/783 |
| 5,605,979 A | 2/1997 | Priddy, Jr. et al. | 525/439 |
| 5,637,655 A | 6/1997 | Priddy, Jr. et al. | 525/438 |
| 5,646,306 A | 7/1997 | Elsasser, Jr. | 549/267 |
| 5,648,454 A | 7/1997 | Brunelle | 528/491 |
| 5,654,395 A | 8/1997 | Jackson, Jr. et al. | 528/308.3 |
| 5,661,214 A | 8/1997 | Brunelle et al. | 524/783 |
| 5,663,282 A | 9/1997 | Todt et al. | 528/274 |
| 5,668,186 A | 9/1997 | Brunelle et al. | 521/48 |
| 5,693,722 A | 12/1997 | Priddy, Jr. et al. | 525/439 |
| 5,700,888 A | 12/1997 | Hall | 526/190 |
| 5,707,439 A | 1/1998 | Takekoshi et al. | 106/483 |
| 5,710,086 A | 1/1998 | Brunelle et al. | 502/171 |
| 5,756,644 A | 5/1998 | Hodge et al. | 528/272 |
| 5,760,161 A | 6/1998 | Goins, Jr. et al. | 528/299 |
| 5,786,440 A | 7/1998 | Kohler et al. | 528/196 |
| 5,795,423 A | 8/1998 | Johnson | 156/166 |
| 5,830,541 A | 11/1998 | Carswell et al. | 427/475 |
| 5,936,029 A | 8/1999 | Hall | 524/572 |
| 5,968,642 A | 10/1999 | Saito | 428/304.4 |
| 6,080,834 A | 6/2000 | Putzig et al. | 528/279 |
| 6,121,466 A | 9/2000 | Osterholt et al. | 549/267 |
| 6,297,330 B1 | 10/2001 | Burch, Jr. et al. | |
| 6,369,157 B1 | 4/2002 | Winckler et al. | 524/783 |
| 6,376,026 B1 | 4/2002 | Correll et al. | 427/512 |
| 6,414,103 B1 | 7/2002 | Correll et al. | 528/25 |
| 6,420,047 B2 | 7/2002 | Winckler et al. | 428/480 |
| 6,420,048 B1 | 7/2002 | Wang | 428/480 |
| 6,436,548 B1 | 8/2002 | Phelps | 428/480 |
| 6,436,549 B1 | 8/2002 | Wang | 428/480 |
| 6,525,164 B2 | 2/2003 | Faler | 528/279 |

FOREIGN PATENT DOCUMENTS

| | | |
|---|---|---|
| DE | 3607627 | 9/1987 |
| DE | 4034574 | 5/1992 |
| EP | 0000544 | 8/1982 |
| EP | 0153785 A2 | 9/1985 |
| EP | 0216496 A2 | 4/1987 |
| EP | 0153785 B1 | 7/1989 |
| EP | 419254 A2 | 3/1991 |
| EP | 486832 A2 | 5/1992 |
| EP | 264835 B1 | 6/1992 |
| EP | 235741 B1 | 1/1993 |
| EP | 543492 A1 | 5/1993 |
| EP | 589640 A1 | 3/1994 |
| EP | 598604 A1 | 5/1994 |
| EP | 601753 A1 | 6/1994 |
| EP | 635512 A1 | 1/1995 |
| EP | 655476 A1 | 5/1995 |
| EP | 436186 B1 | 10/1995 |
| EP | 688778 A1 | 12/1995 |
| EP | 0714926 A2 | 6/1996 |
| EP | 699701 A3 | 9/1996 |
| EP | 0798336 A2 | 1/1997 |
| FR | 2 530 628 | 1/1984 |
| GB | 798412 | 8/1954 |
| GB | 957841 | 5/1964 |
| GB | 991020 | 5/1965 |
| GB | 1044205 | 9/1966 |
| GB | 1108921 | 4/1968 |
| GB | 1273225 | 5/1972 |
| GB | 1349324 | 4/1974 |
| GB | 2 123 405 A | 2/1984 |
| JP | 4621873 | 6/1971 |
| JP | 476425 | 8/1972 |
| JP | 57-122078 A | 7/1982 |
| JP | 6275547 | 4/1987 |
| JP | 6214063 A | 6/1987 |
| JP | 63156824 A | 11/1988 |
| JP | 02298512 | 12/1990 |
| JP | 4253764 | 9/1992 |
| JP | 08-093594 | 4/1996 |
| JP | 09048876 | 2/1997 |
| JP | 09-110832 | 4/1997 |
| JP | 09-238806 | 9/1997 |
| JP | 10-069915 | 3/1998 |
| JP | 10-194262 | 7/1998 |
| JP | 11-136942 | 5/1999 |
| JP | 2001031846 | 2/2001 |
| JP | 2002293902 | 10/2002 |
| JP | 2002293903 | 10/2002 |
| JP | 2002308969 | 10/2002 |
| JP | 2002317041 | 10/2002 |
| JP | 02320499 | 11/2002 |
| JP | 02322272 | 11/2002 |
| JP | 02338672 | 11/2002 |
| SU | 1077893 | 3/1984 |
| SU | 1532560 A1 | 12/1989 |
| WO | 88/06605 | 9/1988 |
| WO | 91/09899 | 7/1991 |

| | | |
|---|---|---|
| WO | 93/04106 | 3/1993 |
| WO | 95/00574 | 1/1995 |
| WO | 95/30702 | 11/1995 |
| WO | 96/22319 | 7/1996 |
| WO | 99/25485 | 5/1999 |
| WO | 00/27632 | 5/2000 |
| WO | 00/38897 | 7/2000 |
| WO | 01/53379 A1 | 7/2001 |
| WO | 01/56694 A1 | 9/2001 |
| WO | 02/18476 A2 | 3/2002 |
| WO | 02/22738 A2 | 3/2002 |
| WO | 02/098946 A1 | 12/2002 |
| WO | 03-031496 A1 | 4/2003 |

OTHER PUBLICATIONS

Cussler et al., "Barrier Membranes," *Journal of Membrane Science*, 38 (1988) pp. 161–174.

Fukushima et al. "Graphite Nanoplatelets as Reinforcements for Polymers: Structural, Electrical and Thermal Properties," *Proc. 2nd Ann., Automotive Comp. Conf., Soc. Plast. Eng.*, Sep. 2002, 7 pgs.

Fukushima et al. "Synthesis of an Intercalated Compound of Montmorillonite and 6–Polyamide," *Journal of Inclusion Phenomena*, 5 (1987) pp. 473–482.

Hall et al. "Recent research on the synthesis and applications of cyclic oligomers," *Reactive & Functional Polymers*, 41 (1999), pp. 133–139.

Ruddick et al. "A new method for the polymer–suported synthesis of cyclic oligoesters for potential applications in macrocyclic lactone synthesis and combinatorial chemistry," *J. Chem. Soc., Perkin Trans. 1*, 2002, pp. 627–637.

Spanagel et al. "Macrocyclic Esters," Contribution No. 153 from The Experimental Station of E.I. duPont deNemours & Company, vol. 57, pp. 929–934.

Uhi et al. "Flame Retarduncy of Graphite Nanocomposites," *Polm. Mater. Sci. Eng.* 83:53(2000).

Usuki et al. "Swelling behavior of montmorillonite cation exchanged for ω–amino acids by ε–caprolactam," *J. Mater. Res.*, vol. 8, No. 5, May 1993, pp. 1174–1178.

Usuki et al. "Synthesis of nylon 6–clay hybrid," J. Mater. Res., vol. 8, No. 5, May 1993, pp. 1179–1184.

Ward et al. "Gas barrier improvement using vermiculite and mica in polymer films," *Journal of Membrane Science*, 55 (1991) pp. 173–180.

Xiao et al. "Preparation of exfoliated graphite/polystyrene composite by polymerization–filling technique," *Polymer*, 42 (2001) pp. 4813–4816.

Ahjopalo, L. et al. (2000) "Cyclic Oligomers in Saturated Polyesters" Polymer, vol. 41, No. 23, 8283–8290.

Brunelle (1995) "Macrocycles For The Synthesis of High Molecular Weight Polymers" pp. 197–235, ch. 6, New Methods of Polymer Synthesis: vol. 2, edited by J.R. Ebdon and G.C. Eastmond.

Brunelle et al. (1998) "Semicrystalline Polymers via Ring–Opening Polymerization: Preparation and Polymerization of Alkylene Phthalate Cyclic Oligomers" *Macromolecules* vol. 31, 4782–4790.

Burch, R. R. et al. (2000) "Synthesis of Cyclic Oligoesters and Their Rapid Polymerization to High Molecular Weight" Macromolecules, vol. 33, No. 14, 5053–5064.

Cotton, N. J. et al. (1993) "Rate and Extent of Supercritical Fluid Extraction of Cyclic Trimer from Poly(Ethylene Terephthalate) at Elevated Temperatures" *Journal of Chromatographic Science*, vol. 31, No. 5, 157–161.

Hamilton et al. (1998) "Cyclic Polyesters: Part 8. Preparation and Characterization of Cyclic Oligomers in Six Aromatic Ester and Ether–Ester Systems" *Polymer* vol. 39, No. 14., 3241–3252.

Harrison, A. G. et al. (1997) "Analysis of cyclic oligomers of poly(ethylene terephthalate) by liquid chromatography/ mass spectrometry" Polymer Communications, vol. 38, No. 10, 2549–2555.

Henshaw et al. (1994) "Recycling of a Cyclic Thermoplastic Composite Material by Injection and Compression Molding" *J. of Thermoplastic Composite Materials* vol. 7 (1), 14–29.

Hubbard, P. A. (1996) "Polyesters via Macrocyclic Oligomers" Dissertation presented at the University of Akron.

Kricheldorf, H. R. et al. (1997) "Macrocycles IV. Macrocyclic Polylactones as Bifunctional Monomers for Polycondensations" *Journal of Polymer Science*, vol. 36, No. 9, 1373–1378.

Kricheldorf, H. R. et al. (1998) "Macrocycles. 3. Telechelic Polyalctones via Macrocyclic Polymerization" Macromolecules, vol. 31, No. 3, 614–620.

Lattimer et al. (1998) "MALDI–MS Analysis of Pyrolysis Products From a Segmented Polyurethane" *Journal of Analytical and Applied Pyrolysis*, vol. 48, 1–15.

Liu et al. (1999) "Preparation of Cyclic Polyester Oligomers and Ultra–low VOC Polyester Coatings" *Polymer Preprints*, vol. 40, No. 1.

Miller, S. (1998) "Macrocyclic polymers from cyclic oligomers of poly(butylene terephthalate)" Dissertation Presented at University of Massachusetts, Amherst, MA US.

Mueller, F.J. et al. (1983) "Synthesis of Cyclic Oligomers of Butylene Terephthalate" *Makromol. Chem.*, vol. 184, No. 12, 2487–95.

Mueller, F. J. et al. (1983) "Synthesis of Cyclic Oligomers of Butylene Terephthalate" *Makromol. Chem.*, vol. 184, No. 12, 2487–95. (Translation).

Perovic, A. (1985) "Morphological Instability of poly(ethylene terephthalate) cyclic oligomer crystals" *Journal of Material Science*, vol. 20, Iss. 4, 1370–1374.

Perocvic et al. (1982) "Crystallization of Cyclic Oligomers in Commercial Poly(ethleneterephthalate) Films" *Polymer Bulletin* vol. 6, 277–283.

Roelens, S. (1988) "Organotin–Mediated Synthesis of Macrocyclic Polyesters: Mechanism and Selectivity in the Reaction of Dioxastannolanes with Diacyl Dichlorides" *Journal of the Chemical Society, Perkin Transactions 2*, vol. 8, 1617–1625.

Patent Cooperation Treaty, Notification of Transmittal of the International Search Report or the Declaration, International Application No. PCT/US01/27648, mailed on Mar. 27, 2002, 6 pages.

Martin et al. (1987) "Pultrusion", *Engineered Materials Handbook:* vol. 1 *Composites*, pp. 533–543.

Brunelle et al. (1997)"Semi–crystalline Polymers via Ring–Opening Polymerization: Preparation and Polymerization of Alkylene Phthalate Cyclic Oligomers" *Polymers Preprints* vol. 38, No. 2, pp. 381–382.

Lui et al. (1999) "Preparation of Cyclic Polyester Oligomers and Ultra–Low VOC Polyester Coatings" *Polymer Reprints*, vol. 40, No. 1, pp. 137–138.

Chisholm et al., "Syntheses and structural characterization of 2,2'–methylene–bis(6–t–butyl–4–methyl–phenoxide) complexes of titanium, zirconium and tantalum," *Polyhedron*, vol. 16, No. 17, (1997) pp. 2941–2949.

Durfee et al., "Chemical and Electrochemical Reduction of Titanium (IV) Aryloxides," *Inorganic Chemistry*, 24 (1985) pp. 4569–4573.

Fantacci et al., "Density Functional Study of Tetraphenolate and Calix[4]arene Complexes of Early Transition Metals," *Inorganic Chemistry*, 40 (2001) pp. 1544–1549.

Hamb et al. "Synthesis of Cyclic Tris(Ethylene Terephthalate)," *Polymer Letters*, 5 (1967), pp. 1057–1058.

Okuda et al., "Synthesis and Characterization of Mononuclear Titanium Complexes Containing a Bis(phenoxy) Ligand Derived from 2,2'–Methylene–bis(6–tert–butyl–4–methylphenol)," *Chem. Ber.*, vol. 128, (1995) pp. 221–227.

Toth et al., "Towards supported catalyst models: the synthesis, characterization, redox chemistry, and structures of the complexes Ti(Oar')$_4$ (Ar'=C$_6$H$_4$(2–t–Bu), C$_6$H(2,3,5,6–Me)$_4$)," *Canadian Journal of Chemistry*, vol. 69, (1991) pp. 172–178.

Youk et al., "Polymerization of Ethylene Terephthalate Cyclic Oligomers with Antimony Trioxide," *Macromolecules*, 33 (2000), pp. 3594–3599.

SPECIES MODIFICATION IN MACROCYCLIC POLYESTER OLIGOMERS, AND COMPOSITIONS PREPARED THEREBY

CROSS-REFERENCE TO RELATED APPLICATION

This application claims priority under 35 U.S.C. 120 as a continuation of U.S. Ser. No. 09/659,975, filed on Sep. 12, 2000, now U.S. Pat. No. 6,436,548 the entirety of which is hereby incorporated by reference herein.

TECHNICAL FIELD

This invention generally relates to thermoplastics and articles formed therefrom. More particularly, the invention relates to macrocyclic polyester oligomer compositions and methods for modifying physical and chemical properties of the compositions. Even more particularly, this invention relates to macrocyclic-polyester oligomer compositions having relatively low melting temperatures.

BACKGROUND INFORMATION

Linear polyesters such as poly(alkylene terephthalate) are generally known and commercially available where the alkylene typically has 2 to 8 carbon atoms. Linear polyesters have many valuable characteristics including strength, toughness, high gloss and solvent resistance. Linear polyesters are conventionally prepared by the reaction of a diol with a dicarboxylic acid or its functional derivative, typically a diacid halide or ester. Linear polyesters may be fabricated into articles of manufacture by a number of known techniques including extrusion, compression molding, and injection molding. Linear polyesters may be produced from macrocyclic polyester oligomers.

Macrocyclic polyester oligomers (MPOs) have unique properties that make them attractive as matrices for engineering thermoplastic composites. These desirable properties stem from the fact that MPOs exhibit low melt viscosity, allowing them to impregnate a dense fibrous preform easily. Furthermore, certain MPOs melt and polymerize at temperatures well below the melting point of the resulting polymer. Upon melting and in the presence of an appropriate catalyst, polymerization and crystallization can occur virtually isothermally. As a result, the time and expense required to thermally cycle a tool is favorably reduced.

Generally speaking, MPO compositions have high melting temperatures, which necessitate the use of special equipment in processing not commonly available in polymer processing units. If compositions with lower melting temperatures could be produced, it would be possible to use more readily available processing equipment such as that is commonly used in the production and handling of epoxy resins.

SUMMARY OF THE INVENTION

Physical and/or chemical properties of MPO compositions may be significantly modified by modifying the weight percentage of one or more of the constituent MPOs. For example, the presence of a single MPO species, the macrocyclic polyester tetramer, has an unexpectedly pronounced effect on the melting temperature of MPO composition. Removal of a portion of the macrocyclic polyester tetramer can result in low-melting MPO compositions. The resulting MPO compositions have the further advantage, under many circumstances, of a greatly reduced tendency to crystallize at ambient temperatures, making it possible to combine them with fillers such as carbon or glass fibers to produce prepregs easily convertible to filled high molecular weight linear polyesters.

In one aspect, the invention is related to a process for modifying a physical property of a composition that includes MPOs. The process includes the steps of (a) providing a composition that has at least two species of MPOs, and (b) changing the weight percentage of at least one species of the MPOs in the composition.

In another aspect, the invention is related to a MPO composition that includes at least two species of MPOs wherein a species of the MPOs having the highest melting temperature is present in an amount less than or equal to 5%. In one embodiment, a blend material includes such a MPO composition and also a polymerization catalyst.

In a preferred embodiment, a MPO composition of the invention comprises 30–40% macrocyclic polyester dimers, 30–45% macrocyclic polyester trimers, 0–5% macrocyclic polyester tetramers, and 5–20% macrocyclic polyester pentamers.

The foregoing and other objects, aspects, features, and advantages of the invention will become more apparent from the following figures, description, and claims.

BRIEF DESCRIPTION OF FIGURES

The drawings are not necessarily to scale, emphasis instead being generally placed upon illustrating the principles of the invention to facilitate its understanding.

DETAILED DESCRIPTION

Figure 1:
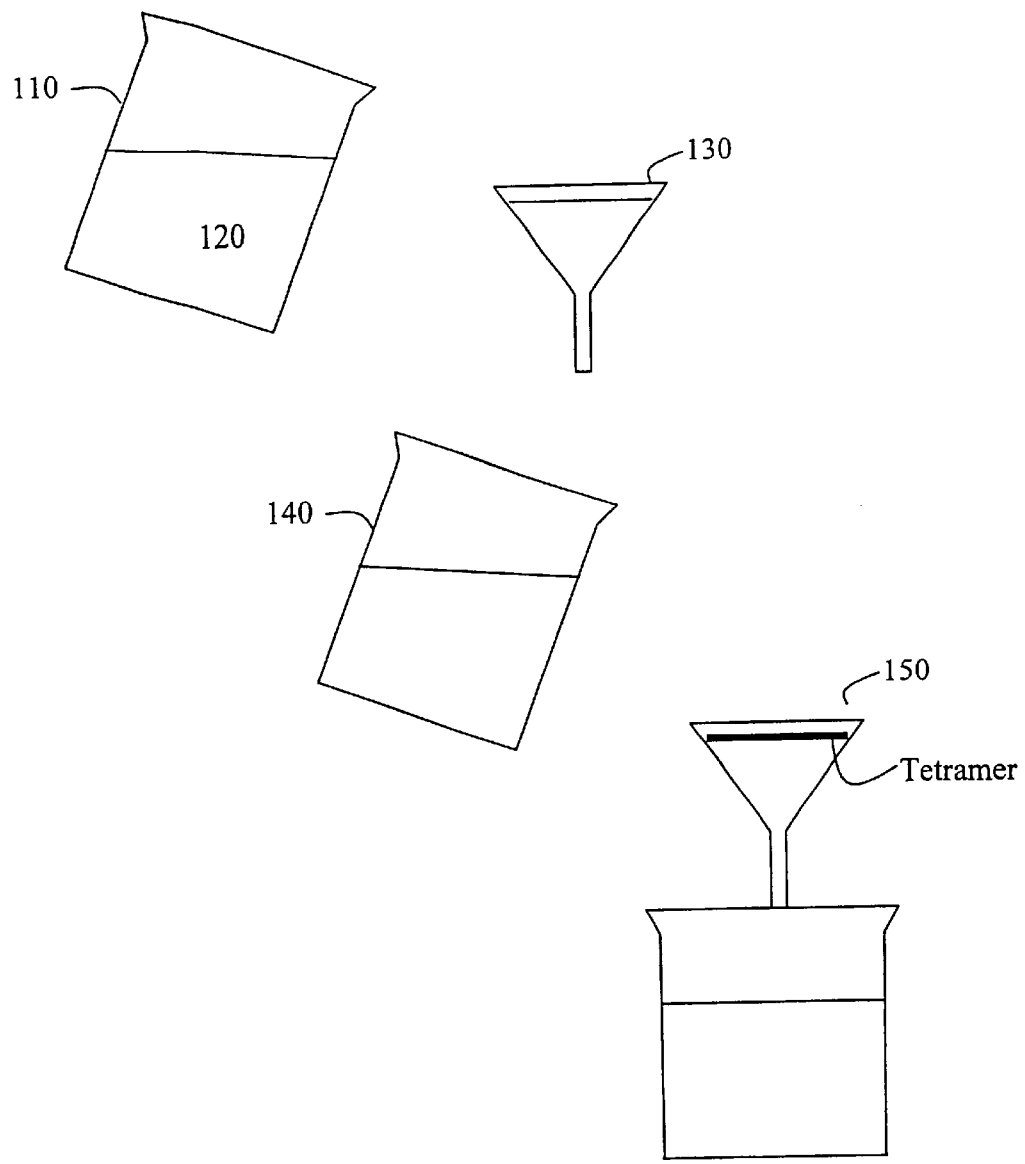
FIG. 1 is a schematic illustration of an embodiment of the invention including a fractional crystallization process.

Physical properties, for example, the melting temperatures, of a composition comprising MPOs may be modified by modifying the weight percentage of a MPO species, for example, the macrocyclic polyester tetramer. A MPO composition having a low melting temperature can be-polymerized and processed at lower temperature thereby avoiding the need for special equipment not commonly available in polymer processing.

Definitions

The following general definitions may be helpful in understanding the various terms and expressions used in this specification.

As used herein, "macrocyclic" means a cyclic molecule having at least one ring within its molecular structure that contains 8 or more atoms covalently connected to form the ring.

As used herein, an "oligomer" means a molecule that contains 2 or more identifiable structural repeat units of the same or different formula.

As used herein, a "macrocyclic polyester oligomer (MPO)" means a macrocyclic oligomer containing structural repeat units having an ester functionality. A MPO typically refers to multiple molecules of one specific formula. However, a MPO also may include multiple molecules of different formulae having varying numbers of the same or different structural repeat units. In addition, a MPO may be a macrocyclic co-polyester oligomer (including macrocyclic multi-polyester oligomer), i.e., an oligomer having two or more different structural repeat units having an ester functionality within one cyclic molecule.

As used herein, "degree of polymerization (DP)" means the number of identifiable structural repeat units in oligomeric or polymeric backbone. The structural repeat units may have the same or different molecular structural. For example, "macrocyclic polyester tetramer" or "tetramer" refers to MPOs with a DP of 4.

As used herein, a "species" means MPOs having the same DP. For example, the macrocyclic polyester tetramer is one species.

As used herein, a "macrocyclic polyester oligomer composition" means a composition comprising a mixture of MPOs having different DP values, whether or not units of more than one molecular structure are present.

As used herein, a "blend material" means a mixture of two or more components including at least one MPO and at least one polymerization catalyst. Preferably the blend material is uniformly mixed. A blend material may also include a filler as well as other components recognized by a skilled artisan.

As used herein, "substantially homo- or co-polyester oligomer" means a polyester oligomer wherein the structural repeat units are substantially identical or substantially two different structural repeat units, respectively.

As used herein, "an alkylene group" means $-C_nH_{2n}-$, where $n \geq 2$.

As used herein, "a cycloalkylene group" means a cyclic alkylene group, $-C_nH_{2n-x}-$, where x represents the number of H's replaced by cyclization(s).

As used herein, "a mono- or polyoxyalkylene group" means $[-(CH_2)_m-O-]_n-(CH_2)_m-$, wherein m is an integer greater than 1 and n is an integer greater than 0.

As used herein, "a divalent aromatic group" means an aromatic group with links to other parts of the macrocyclic molecule. For example, a divalent aromatic group may include a meta- or para-linked monocyclic aromatic group (e.g., benzene).

As used herein, "an alicyclic group" means a non-aromatic hydrocarbon group containing a cyclic structure within.

As used herein, "a filler" means a material other than a MPO or a polymerization catalyst that may be included in the blend material. A filler often is included to achieve a desired purpose or property, and may be present in the resulting polyester polymer. For example, the purpose of the filler may be to provide stability, such as chemical, thermal or light stability, to the blend material or the polyester polymer product, and/or to increase the strength of the polyester polymer product. A filler also may provide or reduce color, provide weight or bulk to achieve a particular density, provide flame resistance (i.e., be a flame retardant), be a substitute for a more expensive material, facilitate processing, and/or provide other desirable properties as recognized by a skilled artisan. Illustrative examples of fillers are, among others, fumed silica, carbon black, titanium dioxide, organo bromides in combination with antimonium oxides, calcium carbonate, chopped fibers, fly ash, glass microspheres, micro-balloons, crushed stone, nanoclay, linear polymers, and monomers.

As used herein, "a polyester polymer composite" means a polyester polymer that is associated with another substrate such as, a fibrous or particulate material. Illustrative examples of particulate materials are chopped fibers, glass microspheres, and crushed stone.

As used herein, "an equilibrated mixture" means a mixture of MPOs in thermodynamic or kinetic equilibration.

As used herein, "fiber" means any material with elongated structure such as polymer or natural fibers. The material can be fiberglass, ceramic fibers, carbon fibers or organic polymers such as aramid fibers.

As used herein, a "tow" or "strand" means a group of fibers together, or a bundle of fibers, which are usually wound onto spools and may or may not be twisted. These tows or strands can be woven or knitted to form fabrics.

As used herein, a "fiber preform" means an assembly of fiber tows and/or fabric held together in a desired shape. Typically, fiber preforms are dry, and often held together with various tackifiers.

As used herein, a "prepreg" means a fiber material such as carbon fiber, glass fiber, or other fiber, that has been impregnated with a resin material in sufficient volume as to provide the matrix of the composite, and such that the ratio of fiber to resin is closely controlled. The fiber configuration can be in tow form, woven or knitted into a fabric, or in a unidirectional tape.

I. Macrocyclic Polyester Oligomers (MPOs)

Many different MPOs can readily be made and are useful in the practice of this invention. MPOs that may be employed in this invention include, but are not limited to, macrocyclic poly(alkylene dicarboxylate) oligomers having a structural repeat unit of the formula:

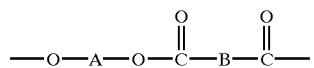

where A is an alkylene, or a cycloalkylene or a mono- or polyoxyalkylene group; and B is a divalent aromatic or alicyclic group. MPOs that may be employed in this invention may have various DP values, e.g., 2 to 20, 2 to 10, 2 to 8, and 2 to 6.

MPOs may be prepared by known methods. Synthesis of the preferred MPOs may include the step of contacting at least one diol of the formula HO—A—OH with at least one diacid chloride of the formula:

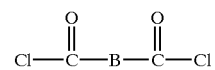

where A and B are as defined above. The reaction typically is conducted in the presence of at least one amine that has substantially no steric hindrance around the basic nitrogen atom. An illustrative example of such an amine is 1,4-diazabicyclo[2.2.2]octane (DABCO). The reaction usually is conducted under substantially anhydrous conditions in a substantially water immiscible organic solvent such as methylene chloride. The temperature of the reaction typically is between about −25° C. and about 25° C. See, e.g., U.S. Pat. No. 5,039,783 to Brunelle et al.

MPOs have also been prepared via the condensation of a diacid chloride with at least one bis(hydroxyalkyl) ester such as bis(4-hydroxybutyl) terephthalate. The condensation typically occurs in the presence of a highly unhindered amine or a mixture thereof with at least one other tertiary amine such as triethylamine. Usually, a substantially inert organic solvent such as methylene chloride, chlorobenzene, or a mixture thereof is used. See, e.g., U.S. Pat. No. 5,231,161 to Brunelle et al.

Another method for preparing MPOs, including macrocyclic co-polyester oligomers, is to depolymerize linear polyester polymers in the presence of an organotin or titanate compound. In this method, linear polyesters are converted to MPOs by heating a mixture of linear polyesters, an organic solvent, and a trans-esterification catalyst such as a tin or titanium compound. The solvents used, such as o-xylene and o-dichlorobenzene, usually are substantially free of oxygen and water. See, e.g., U.S. Pat. Nos. 5,407,984 to Brunelle et al. and 5,668,186 to Brunelle et al.

It is also within the scope of the invention to employ macrocyclic homo- and co-polyester oligomers to produce homo- and co-polyester polymers, respectively. Therefore, unless otherwise stated, an embodiment of a composition, article, or process that refers to a MPO may also include co-polyester embodiments.

Among homopolymeric compositions and in one embodiment, MPOs of poly(1,4-butylene)terephthalate (PBT) are used. Among homopolymeric compositions and in another embodiment, MPOs of polyethylene terephthalate (PET) are used. Among co-polymeric compositions and in one embodiment, MPO species contain a major proportion of PBT structural units, PET structural units, or both. In one embodiment, MPO species contain at least about 90 mole percent of PBT structural units, PET structural units, or both. In another embodiment, MPO species contain predominately PBT, and a minor proportion of other units, for example, poly(alkylene dicarboxylate) units or ether oxygen-containing units such as those in which A is derived from diethylene glycol.

II. Designing Physical and Chemical Properties of MPO Compositions

In one embodiment, MPO compositions are created that have physical and/or chemical properties different from that of the unmodified MPO compositions originally produced. For example, the melting temperatures of a MPO composition can be significantly decreased by removal from the MPO composition of a major proportion of the macrocyclic polyester tetramer, i.e., the oligomer having a DP of 4. This is possible because the tetramer is both high melting and highly crystalline among the MPOs. Therefore, removal has a significant effect on the melting temperature and crystallinity of the oligomer composition. Similarly, the melting temperatures of a MPO composition can be significantly increased by adding into the MPO composition a significant proportion of the macrocyclic polyester tetramer.

In one aspect, the invention relates to a process for modifying a physical property of a composition having MPOs. The method includes the steps of (a) providing a composition having at least two species of MPOs, and (b) changing the weight percentage of at least one species of the MPOs in the composition. It should be understood that compositions may have three, four, or five or more species of MPOs present. In addition, although preferably the weight percentage of one species of the MPOs in the composition is changed, the invention contemplates changing more than one species in a composition.

In one embodiment, the physical property to be modified is the melting temperature of the composition. Besides melting temperature, other physical properties that may be modified by the method of the invention include, for example, crystallinity and viscosity. Modification of a selected physical property may be achieved by either increasing or reducing the weight percentage of at least one species of the MPOs in the composition.

In one embodiment, the weight percentage of at least the species having the highest melting temperature is reduced in step (b). In one embodiment, the weight percentage of at least macrocyclic polyester tetramer is reduced in step (b). In one embodiment, the MPO composition includes macrocyclic PBT oligomers. In another embodiment, the MPO composition includes macrocyclic PET oligomers. The MPO composition may contain homo-oligomer, co-oligomer, or both. In one embodiment, a MPO composition includes a macrocyclic co-polyester oligomer that has at least about 90% mole percent PBT structural units.

The proportion of macrocyclic polyester tetramer present in products prepared by reactions under thermodynamic control is generally greater than the proportion resulting from reactions under kinetic control. An example of a thermodynamically controlled reaction is depolymerization. The reaction of a diol with a dicarboxylic acid chloride is chiefly kinetically controlled.

In one embodiment, the proportion of macrocyclic polyester tetramer removed according to the invention is at least 60% by weight of the total amount of the macrocyclic polyester tetramer in the oligomer composition as originally prepared. The amount of macrocyclic polyester tetramer present can vary according to the method of preparation of the oligomer composition. In another embodiment, at least 70% of the macrocyclic polyester tetramer is removed. In yet another embodiment, at least 90% removal is performed.

In one embodiment, the reduction of the weight percentage of the macrocyclic polyester tetramer results in its weight percentage in the modified composition to be 60% less than its weight percentage in an equilibrated mixture of the MPOs according to the method of preparation. In another embodiment, the weight percentage reduction is 70%. In yet another embodiment, the weight percentage reduction is 90%.

Any processes that result in modification of the weight percentage of a species of the MPOs may be employed. The effectiveness of such processes may be dependent on factors including the nature of the original MPO composition and the particular species the proportion of which is to be modified. Illustrative examples of such processes include distillation, fractional crystallization, anti-solvent precipitation, addition and mixing, chemical reactions, etc.

In one embodiment, removal of a species of MPOs is achieved by fractional crystallization. In one embodiment, the macrocyclic polyester tetramer is removed by fractional crystallization from a solution of the MPO composition. Any solvent that facilitates fractional crystallization may be employed. Illustrative suitable solvents include aromatic hydrocarbons and halogenated aromatic hydrocarbons, such as toluene, xylene and o-dichlorobenzene (ODCB). For example, in one embodiment, a 5% by weight solution of oligomer composition in ODCB at 110° C. is cooled to ambient temperature of about 25° C., whereupon a precipitate forms that contains a major proportion of the tetramer.

In one embodiment, removal of the macrocyclic polyester tetramer is achieved by anti-solvent precipitation. Illustrative suitable non-solvents include aliphatic hydrocarbons, especially those in the $C_{6-10}$ range such as hexane, heptane, octane and decane. In one preferred embodiment, heptane is used.

In one embodiment of a process of removing macrocyclic polyester tetramer by anti-solvent precipitation, the non-solvent is added to the MPO solution at an elevated temperature, in the range of about 80–120° C., after which the mixture is allowed to cool to a lower temperature, typically no higher than about 70° C. since at lower temperatures substantial amounts of other oligomers, or the MPO composition in its entirety, may be precipitated. The amount of non-solvent added is most often about 90–110% by volume of solvent used. Upon cooling to this lower temperature, a precipitate forms that is predominantly the macrocyclic polyester tetramer. A minor proportion of the macrocyclic polyester tetramer originally present usually remains in the MPO composition in solution. However, the remaining macrocyclic polyester tetramer does not have a significant effect on the melting temperature and crystallinity of the MPO composition.

The MPO species removed may be reused for various purposes. In one embodiment, the MPO species, e.g., macrocyclic polyester tetramer, is polymerized separately or in combination with other MPOs or linears to produce linear polyester. In another embodiment, the MPO species is equilibrated with linear polyester that is intended to be depolymerized, either before or during the depolymerization reaction. Depolymerization of a mixture of linear polyester and the MPO species removed from a MPO composition provides an oligomeric product that has the same distribution of oligomers as that obtained from linear polyester alone, showing that equilibration is essentially complete.

The apparatus for performing the above modification processes may be any conventional apparatus. The actual apparatus will depend on the actual process being employed. In one embodiment for performing fractional crystallization (referring to FIG. 1), an apparatus for producing the compositions of the invention may include a reactor vessel 110 in which the reaction constituents 120, e.g., linear polyester, solvent and depolymerization catalyst, are combined and the depolymerization reaction conducted. Subsequently, the product mixture passes through a filter 130 to remove linears. The filtrate may pass into a second vessel 140 where it is cooled to room temperature either in the presence or absence of aliphatic hydrocarbon as non-solvent to precipitate a species of MPO, e.g., the tetrameric species. The filtrate is then passed through another filter 150 which removes the precipitate, e.g., macrocyclic polyester tetramer. The precipitated macrocyclic polyester oligomers can be removed from the filter 150 and recycled to the reactor vessel 110. Further vessels may be employed downstream to isolate the product in the desired form and to remove non-solvent when it is employed.

In a preferred embodiment of the invention, a MPO composition includes at least two species of MPOs wherein the species having the highest melting temperature is present in an amount less than or equal to 10%, preferably less than or equal to 5%, more preferably less than or equal to 3%.

In one embodiment, the MPOs in the MPO composition have a DP from 2 to about 20. In another embodiment, the MPOs have a DP from 2 to about 10. In another embodiment, the MPOs have a DP from 2 to about 8. In yet another embodiment, the MPOs have a DP from 2 to about 6.

In one embodiment, the species having the highest melting temperature is macrocyclic polyester tetramer. In one embodiment, the MPO composition includes macrocyclic PBT oligomers. In another embodiment, the MPO composition includes macrocyclic PET oligomers. The MPO composition may contain homo-oligomer, co-oligomer, or both. In one embodiment, the MPO composition includes a macrocyclic co-polyester oligomer that has at least about 90% mole percent PBT structural units.

In one embodiment, the MPO composition includes 30–40% macrocyclic polyester dimers, 30–45% macrocyclic polyester trimers, 0–5% macrocyclic polyester tetramers, and 5–20% macrocyclic polyester pentamers. In some embodiments, the percentage of macrocyclic polyester tetramers preferably is less than about 3%, more preferably less than about 2%, or most preferably less than about 1%.

In one embodiment, the MPO composition includes a filler. In another embodiment, the MPO composition includes a polymerization catalyst. In another embodiment, the MPO composition is part of a prepreg composition.

MPO compositions in which a major proportion of the macrocyclic polyester tetramer has been removed have melting temperatures significantly lower than those of corresponding compositions containing macrocyclic polyester tetramer in the original proportions, i.e., the unmodified product mixtures (equilibrated or nearly equilibrated) of the MPO-forming reactions. The melting temperatures typically are wide ranges by reason of the various kinds of MPO molecules in the MPO compositions. The most pronounced decrease in temperature is in the upper value of the range, i.e., the temperature at which the last trace of solid melts. Typically, the upper value of the melting temperature range of a modified MPO composition may be from about 15° C. to as much as 70° C. lower than the upper value for the unmodified original MPO composition.

This decrease in melting temperature is typically accompanied by a significant decrease in crystallinity, particularly upon heating above the melting temperature followed by quenching. Thus, MPO compositions in which macrocyclic polyester tetramer has been removed can be quenched and used to impregnate fibrous or other fillers, whereupon a prepreg composition capable of being draped and shaped is produced.

III. Polymerization Catalysts

Polymerization catalysts that may be employed in the invention are capable of catalyzing the polymerization of MPOs. Organotin and organotitanate compounds are preferred catalysts, although other catalysts may be used. For example, organotin compound 1,1,6,6-tetra-n-butyl-1,6-distanna-2,5,7,10-tetraoxacyclodecane may be used as polymerization catalyst. Other illustrative organotin compounds include n-butyltin(IV) chloride dihydroxide, dialkyltin(IV) oxides, such as di-n-butyltin(IV) oxide and di-n-octyltin oxide, and acyclic and cyclic monoalkyltin(IV) derivatives such as n-butyltin tri-n-butoxide, dialkyltin(IV) dialkoxides such as di-n-butyltin(IV) di-n-butoxide and 2,2-di-n-butyl-2-stanna-1,3-dioxacycloheptane, and trialkyltin alkoxides such as tributyltin ethoxide. See, e.g., U.S. Pat. No. 5,348,985 to Pearce et al.

Also, trisstannoxanes having the general formula (I) shown below can be used as a polymerization catalyst to produce branched polyester polymers.

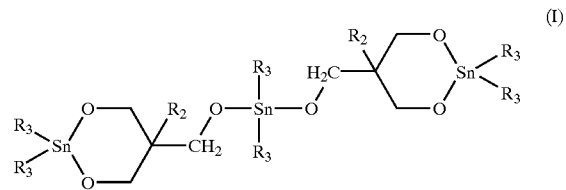

(I)

where $R_2$ is a $C_{1-4}$ primary alkyl group and $R_3$ is $C_{1-10}$ alkyl group.

Additionally, organotin compounds with the general formula (II) shown below can be used as a polymerization catalyst to prepare branched polyester polymers from MPOs.

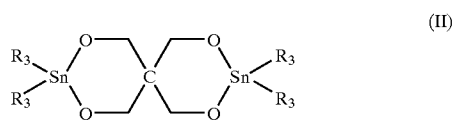

(II)

where $R_3$ is defined as above.

As for titanate compounds, tetra(2-ethylhexyl) titanate, tetraisopropyl titanate, tetrabutyl titanate, and titanate compounds with the general formula (III) shown below can be used as polymerization catalysts.

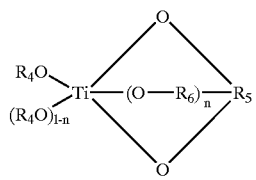
(III)

wherein: each $R_4$ is independently an alkyl group, or the two $R_4$ groups taken together form a divalent aliphatic hydrocarbon group; $R_5$ is a $C_{2-10}$ divalent or trivalent aliphatic hydrocarbon group; $R_6$ is a methylene or ethylene group; and n is 0 or 1.

Typical examples of titanate compounds with the above general formula are shown in Table 1.

TABLE 1

Examples of Titanate Compounds Having Formula (III)

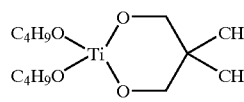

Di-1-butyl 2,2-dimethylpropane-1,3-dioxytitanate

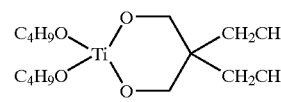

Di-1-butyl 2,2-diethylpropane-1,3-dioxytitanate

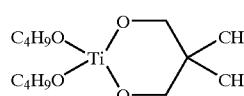

Di-1-butyl 2(1-propyl)-2-methylpropane-1,3-dioxytitanate

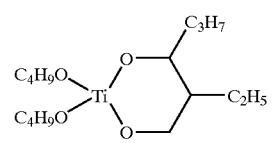

Di-1-butyl 2-ethylhexane-1,3-dioxytitanate

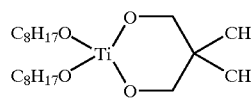

Di(2-ethyl-1-hexyl) 2,2-dimethylpropane-1,3-dioxytitanate

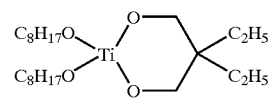

Di(2-ethyl-1-hexyl) 2,2-diethylpropane-1,3-dioxytitanate

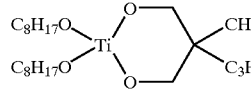

Di(2-ethyl-1-hexyl) 2-(1-propyl)-2-methylpropane-1,3-dioxytitanate

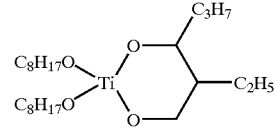

Di(2-ethyl-1-hexyl) 2-ethylhexane-1,3-dioxytitanate

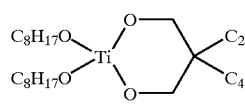

Di(2-ethyl-1-hexyl) 2-(1-butyl)-2-ethylpropane-1,3-dioxytitanate

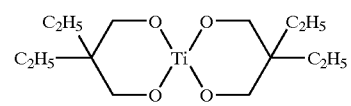

Bis(2,2-diethyl-1,3-propylene) titanate

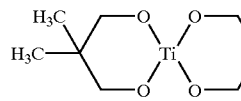

Bis(2,2-dimethyl-1,3-propylene) titanate

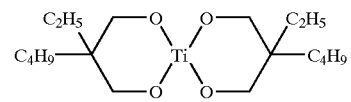

Bis(2-(1-butyl)-2-ethyl-1,3-propylene) titanate

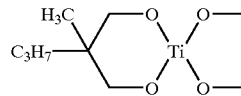

Bis(2-(1-propyl)-2-methyl-1,3-propylene) titanate

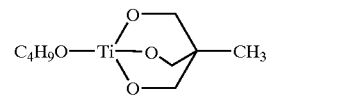

1-(1-Butoxy)-4-methyl-2,6,7-trioxa-1-titanabicyclo[2,2,2]octane

TABLE 1-continued

Examples of Titanate Compounds Having Formula (III)

| Structure | Name |
|---|---|
| | Bis(2-ethyl-1,3-hexylene) titanate |
| | 1-(1-Butoxy)-4-ethyl-2,6,7-trioxa-1-titanabicyclo[2,2,2]octane |
| | 1-(2-ethyl-1-hexoxy)-4-methyl-2,6,7-trioxa-1-titanabicyclo[2,2,2]octane |
| | 1-(2-Propoxy)-4-ethyl-2,6,7-trioxa-1-titanabicyclo[2,2,2]octane |
| | 1-(2-ethyl-1-hexoxy)-4-ethyl-2,6,7-trioxa-1-titanabicyclo[2,2,2]octane |

Titanate ester compounds having at least one moiety of the following general formula have also been used as polymerization catalysts:

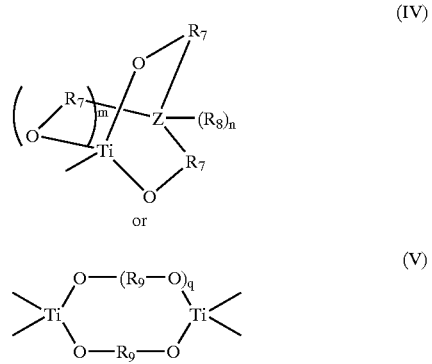

(IV)

or (V)

wherein:

each $R_7$ is independently a $C_{2-3}$ alkylene group;

$R_8$ is a $C_{1-6}$ alkyl group or unsubstituted or substituted phenyl group;

Z is O or N; provided when Z is O, m=n=0, and when Z is N, m=0 or 1 and m+n=1;

each $R_9$ is independently a $C_{2-6}$ alkylene group; and q is 0 or 1.

Typical examples of such titanate compounds are shown below as formula (VI) and formula (VII):

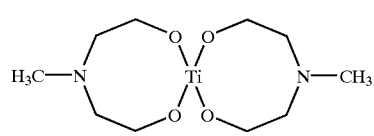

(VI)

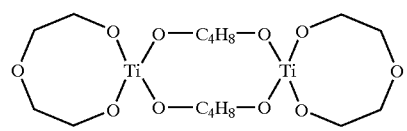

(VII)

IV. The Blend Material

A blend material comprising MPOs and a polymerization catalyst allows for easy production, storage, transportation and processing. From the standpoint of applications, the blend material is a one-component ready-to-use mixture. The blend material may also be processed like a thermoset while producing a thermoplastic. Furthermore, the blend material may eliminate the need for existing equipment to be modified to allow for transfer of the MPO and a polymerization catalyst into the equipment in the appropriate amounts at the appropriate time and at the appropriate temperature.

In one aspect, the invention relates to a blend material comprising a MPO composition with a modified physical property (e.g., the melting temperature as described above) and a polymerization catalyst.

There is no limitation with respect to the physical form of the MPO when mixed with the polymerization catalyst as long as the MPO remains substantially chemically intact. In one embodiment, the MPO is a solid such as a powder. In this embodiment, mechanical mixing typically is used to mix MPO with a polymerization catalyst. In another embodiment, the MPO is mixed in the presence of a solvent with the solvent remaining present during the step of mixing.

In one embodiment, the blend material also includes a filler as described above. Illustrative examples of such fillers include pigments, light weight fillers, flame retardants, and ultraviolet light stabilizers. For example, calcium carbonate may be used to increase the thickness of a polyester polymer product to improve its mechanical performance. Also, glass microspheres may be added to lower the density of the product. Other fillers include nanoclays, e.g., to increase the modulus of the product, organo bromides in combination with antimonium oxides, e.g., to impart flame resistance, and colorants such as carbon black or titanium dioxide.

The filler is added generally between about 0.1% and 70% by weight, between about 25% and 70% by weight, or between about 2% and 5% by weight depending on the filler and the purpose for adding the filler. For example, the percentage is preferably between 25% and 50% by weight in the case of calcium carbonate, between 2% and 5% by weight in the case of nanoclays, between 0.1% and 1% in the case of pigments, and between 25% and 70% by weight in the case of glass microspheres.

A process for preparing the blend material includes providing a MPO and mixing the MPO with a polymerization catalyst. When preparing the blend, the MPO and the polymerization catalyst may be mixed together by various means. For example, any conventional mixer or blender may be employed to mix the MPO with the polymerization catalyst via agitation at temperatures below the melting temperature of the MPO. This process may be conducted under an inert atmosphere such as a nitrogen atmosphere.

A solvent may also be employed to assist in the uniform mixing of the MPO with the polymerization catalyst. Various solvents can be used, and there is no limitation with respect to the type of solvent that may be used other than that the solvent is substantially free of water. Illustrative examples of solvents that may be employed in the invention include methanol, ethanol, isopropanol, acetone, methyl ethyl ketone, benzene, toluene, o-xylene, chlorobenzene, dichloromethane, and chloroform.

There is no limitation with respect to the amount of solvent to be employed other than that the amount results in a uniform mixing of the MPO and the polymerization catalyst. In one embodiment, the blend of MPO with the polymerization catalyst is isolated either by direct removal of the solvent via evaporation or by precipitation via addition of the mixture into a nonsolvent. In another embodiment, the blend of solid ingredients is further dried under vacuum at elevated temperatures below the melting temperature of the MPO to remove any residual solvent.

A process for preparing the blend material further having at least one filler, or any other additional material, is generally the same as described above, however, the characteristics of the filler and/or additional materials must be considered. It should be understood that the MPO, the polymerization catalyst, the filler, any additional material(s) and/or solvent, if used, may be mixed in any order or simultaneously as long as the final composition contains the appropriate amount of each ingredient.

It is within the scope of the invention to employ one, two or more different fillers in preparing a blend material of MPO and polymerization catalyst. Unless specifically stated otherwise, any embodiment of a composition, article or process that refers to filler in singular also includes an embodiment wherein two or more different fillers are employed. Similarly, unless stated otherwise, any embodiment of a composition, article or process that refers to fillers in plural also includes an embodiment wherein one filler is employed.

In one embodiment of the invention, the amount of polymerization catalyst employed is generally about 0.01 to about 10.0 mole percent, preferably about 0.1 to about 2 mole percent, and more preferably about 0.2 to about 0.6 mole percent based on total moles of monomer repeat units of the MPO.

Although dependent on the particular composition of the blend material, blend materials typically exhibit a shelf life generally longer than a week, and preferably longer than a month, and more preferably longer than a year when stored at ambient temperature.

It is within the scope of the invention to employ one, two or more different polymerization catalysts in preparing a blend of MPO and polymerization catalyst. Unless specifically stated otherwise, any embodiment of a composition, article or process that refers to polymerization catalyst in singular also includes an embodiment wherein two or more different polymerization catalysts are employed. Similarly, unless stated otherwise, any embodiment of a composition, article or process that refers to polymerization catalyst in plural also includes an embodiment wherein one polymerization catalyst is employed. Two or more polymerization catalysts may be used to vary the rate of polymerization and to produce polyesters with variable degrees of branching.

V. Polymerization of MPOs

In another aspect, the invention relates to a process for polymerizing a MPO composition that includes the steps of (a) providing a MPO composition with a modified physical property (e.g., the melting temperature as described above), (b) providing a polymerization catalyst, and (c) polymerizing the MPOs. The MPOs and the polymerization catalyst may be components of a blend material. Therefore, in one embodiment, a process for polymerizing a MPO composition includes the steps of (a) providing a blend material having a MPO composition with a modified physical property, e.g., the melting temperature, and (b) polymerizing the MPOs. In one embodiment, the polymerization is conducted in the range of 130° C. to 230° C.

By reason of the lower melting temperature and decrease in crystallinity, it is frequently possible to polymerize the compositions of the present invention to linear polyesters at lower temperatures than with previously known MPO compositions. For example, a conventionally prepared macrocyclic PBT oligomer composition may require a polymerization temperature (in the presence of a conventional tin compound as catalyst) on the order of 190° C. and will not polymerize at 150° C. The corresponding composition, from which most of the tetramer has been removed according to this invention, has been polymerized to high molecular weight PBT at temperatures as low as 148° C.

In other respects, the compositions of MPOs in which tetramers have been removed are similar to known MPO compositions in that they may be polymerized under a wide variety of conditions in the presence of polymerization catalysts to linear polyesters having a wide variety of uses.

Blends of MPOs with catalyst and/or filler may be polymerized in processes such as rotational molding, resin film infusion, pultrusion, resin transfer molding, filament winding, making and using powder-coated or hot melt prepreg, water slurry process, compression molding, and roll wrapping. These processes may be used to form polyester compositions, including composites, which may be included in articles of manufacture such as carbon fiber golf shafts and lightweight automotive chassis members, construction materials, and so on.

The following examples are provided to further illustrate and to facilitate the understanding of the invention. These specific examples are intended to be illustrative of the invention.

EXAMPLE A

General Depolymerization Procedure

Dissolve dry poly(1,4-butylene terephthalate) (PBT) pellets in dry o-dichlorobenzene (ODCB) under inert atmosphere at 180° C. Add a titanate catalyst as a solution in ODCB or as a neat solid. The depolymerization reaction is carried out at about 180° C. The reaction can be sampled over time to determine progress. When equilibrium is reached (usually within 1 hour), the reaction is cooled to 100° C. and water is added to quench the titanate catalyst (add about 0.5% water by volume). After quenching, the reaction mixture is concentrated by removing 70–95% of the ODCB. This step can be done from 70–180° C. by adjusting pressure during the strip.

After the initial concentration step, the reaction is allowed to cool to about 70° C. and filtered to remove the bulk of the linears which fall from solution. The filtrate, which contains the MPOs, is concentrated to about 30% solids at about 110° C. An equal volume of heptane is added and the reaction is allowed to cool to about 70° C. to precipitate the PBT tetramer. Filter to remove the PBT tetramer and pass the filtrate through a column of alumina to remove residual linears. Pure MPOs are then isolated by heptane precipitation or by concentration.

PBT used in these experiments was produced by General Electric (Valox 315 grade) and was dried in vacuo at about 120° C. before use. Anhydrous ODCB was used as received from Aldrich. Titanate catalysts were prepared from tetraisopropyl titanate from DuPont that was vacuum distilled prior to use. Diols that were dried over molecular sieves. All other reagent grade solvents and chemicals were used as received.

HPLC analysis was used to characterize the composition of the MPOs and to follow progression of depolymerization reactions. HPLC analysis was conducted using a Hewlett Packard Series 1050 chromatography system. Samples were eluted at 1.5 ml/min through a 4.6×15 cm Zorbax Eclispe XBD-C8 column at 40° C. A linear acetonitrile:water gradient which ramped from 50:05 to 100:0 over 18 min was used. Analysis was calibrated using pure PBT dimer which was isolated by vacuum sublimation. MPOs were quantified using phenanthrene as an internal calibration standard. Peaks were measured at 254 nm with a UV detector.

Analyses for polymer $M_w$ were conducted using a Hewlett Packard Series 1100 chromatography system. Samples were eluted at 1 ml/min with chloroform through a bank of two Phenomenex Phenogel 5 μm linear 300×7.8 mm columns at 40° C. Peaks were detected with a UV detector at 254 nm and the instrument was calibrated using polystyrene standards.

HPLC retention times of MPOs are shown in Table 1. Melting range data of select MPO compositions is shown in Table 2.

TABLE 1

HPLC Retention Times of Select MPOs

| MPO | Dimer (PBT) | Trimer (PBT) | Tetramer (PBT) | Pentamer (PBT) |
|---|---|---|---|---|
| HPLC $T_r$ (min.) | 6.8 | 11.5 | 13.6 | 15.4 |

TABLE 2

Melting Ranges of Select MPO Compositions

| Sample | % Dimer | % Trimer | % Tetramer | % Pentamer | % co-MPO | Melt Range ° C. |
|---|---|---|---|---|---|---|
| a | 13.1 | 12.9 | 51.9 | 11.7 | 9.3 | 175–218 |
| b | 2 | 46.7 | 29.8 | 21.5 | 0 | 120–215 |
| c | 32.2 | 38.2 | 16.6 | 13.1 | 0 | 120–200 |
| d | 34.5 | 29.9 | 12.8 | 11.2 | 13.8 | 125–175 |
| e | 30.6 | 34.3 | 10.2 | 10.2 | 14.2 | 125–168 |
| f | 37.1 | 37 | 1.48 | 10 | 14.5 | 125–148 |

EXAMPLE 1

A 22.2 g sample of commercially available PBT was dissolved in 1,450 g (1,107 ml) of ODCB and depolymerized in the presence of 2.8 mole percent of a mixed 1,4-butanediol/2-methyl-2,4-pentanediol (4.3:1 molar) titanate catalyst. MPOs were obtained in the amount of 11.4 g, or 51.8% of theoretical.

The reaction mixture was quenched with water at 100° C. and ODCB was distilled off to a MPO concentration of 11% by weight (71 ml of ODCB). A sample was removed and stripped of solvent; it was found to have a melting temperature of 100–210° C.

Heptane, 71 ml, was added to the remaining oligomer composition at 110° C. and the reaction mixture was allowed to cool to 70° C., whereupon a precipitate formed. The mixture was filtered; the filtration residue was found by HPLC analysis to contain about 96% by weight of the tetramer in the reaction product. The filtrate was poured into an excess of heptane to precipitate the remaining oligomers which were found to have a melting temperature of 100–150° C.

EXAMPLE 2

A 250 ml round-bottomed flask equipped with a magnetic stirrer was charged with 85 g (64 ml) of ODCB and 15 g of a macrocyclic PBT oligomer composition prepared by the reaction of terephthaloyl chloride with bis(4-hydroxybutyl) terephthalate. A control sample of the oligomer composition was found to have a melting temperature of 100–180° C.

Heptane, 64 ml, was added slowly to the remaining oligomer composition at 110° C. and the reaction mixture was allowed to cool over 1 hour to 75° C., whereupon a precipitate formed. The mixture was filtered; the filtration residue was found to contain about 90% by weight of the cyclic tetramer in the reaction product. The filtrate was poured into an excess of heptane to precipitate the remaining oligomers which were found to have a melting temperature of 100–130° C.

EXAMPLE 3

A 3 l round-bottomed flask equipped with a magnetic stirrer and thermometer was charged with 700 g (534 ml) of ODCB and 300 g of a macrocyclic PBT oligomer composition prepared by the reaction of terephthaloyl chloride with 1,4-butanediol. A control sample of the oligomer composition was found to have a melting temperature of 120–175° C.

The mixture was heated to 110° C. to dissolve all of the oligomers and heptane, 534 ml, was added slowly at 110° C. The reaction mixture was allowed to cool to 75° C., whereupon a precipitate formed. The mixture was filtered; the filtration residue was found to contain about 73% by weight of the cyclic tetramer in the reaction product. The filtrate was poured into an excess of heptane to precipitate the remaining oligomers which were found to have a melting temperature of 120–158° C.

EXAMPLE 4

A 5% (by weight) solution in ODCB of macrocyclic PBT oligomers, prepared as described in Example 1, was found to be a homogeneous liquid at 110° C. Upon cooling to room temperature, a precipitate deposited from the solution. The precipitate was found by analysis to be 90% pure cyclic tetramer, and to constitute 60% by weight of the tetramer present in the original oligomer composition.

EXAMPLE 5

A 300 mg control sample of the PBT oligomer composition employed in Example 2, from which the tetramer had not been removed, was placed in a test tube and submerged in an oil bath maintained at 150° C. for 10 minutes. The composition did not melt at this temperature. A sample of the product of Example 2, from which tetramer had been removed, melted when heated to the same temperature but crystallized to an opaque, brittle solid upon cooling.

When the product of Example 2 was heated to 150° C. and quenched by submersion in cold water, it remained transparent, indicating that it was amorphous rather than crystalline after quenching. It remained amorphous and tacky after storing at ambient temperature for one month. By contrast, the control returned to a brittle, crystalline state upon standing for 48 hours.

EXAMPLE 6

A 3 l round-bottomed flask was charged with 3,098 ml of ODCB, 26.3 g of commercially available PBT pellets, and 4.9 g of tetramer removed from a MPO composition as described in Example 3. The resulting mixture was heated to 180° C. until all solids were dissolved and a titanate catalyst similar to that of Example 1 was added in a similar proportion to PBT. Heating at 180° C. was continued for one hour, after which a portion of the mixture was analyzed and found to contain MPOs in a proportion similar to that observed in Example 1.

While typical embodiments have been set forth for the purpose of illustration, the foregoing descriptions and examples should not be deemed to be a limitation on the scope of the invention. Accordingly, various modifications, adaptations, and alternatives may occur to one skilled in the art without departing from the spirit and scope of the present invention.

The patents and references referred to above are incorporated by reference including: U.S. Pat. Nos. 5,039,783, 5,191,013, 5,231,161, 5,348,985, 5,389,719, 5,407,984, 5,466,744, 5,591,800, 5,661,214, 5,668,186, and 5,710,086.

What is claimed is:

1. A process for modifying a melting temperature of a composition comprising macrocyclic polyester oligomers, the process comprising the steps of:
   (a) providing a composition comprising at least two species of macrocyclic polyester oligomers, each of the macrocyclic polyester oligomers comprising a structural repeat unit of the formula

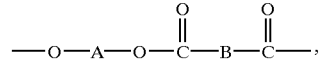

wherein
   A is an alkylene, a cycloalkylene, or a mono- or polyoxyalkylene group, and
   B is a divalent aromatic or alicyclic group; and
   (b) performing fractional crystallization to reduce the weight percentage of at least one species of the macrocyclic polyester oligomers in the composition.

2. The process of claim 1, wherein the at least one species of the macrocyclic polyester oligomers in step (b) comprises a macrocyclic polyester tetramer.

3. The process of claim 1, wherein step (a) comprises providing a composition that comprises at least two species of macrocyclic polyester oligomers and a solvent, and step (b) comprises cooling the composition to a temperature below about 70° C. to crystallize at least one species of the macrocyclic polyester oligomers in the composition.

4. The process of claim 3, wherein step (b) comprises cooling the composition to about 25° C.

5. The process of claim 3, wherein step (b) further comprises filtering the composition to separate the crystallized at least one species of the macrocyclic polyester oligomers.

6. The process of claim 5, wherein step (b) further comprises removing the solvent from the filtrate to yield a composition of macrocyclic polyester oligomers having a reduced weight percentage of at least one species of the macrocyclic polyester oligomers.

7. A process for modifying a physical property of a composition comprising macrocyclic polyester oligomers, the process comprising the steps of:
   (a) providing a composition comprising at least two species of macrocyclic polyester oligomers, each of the macrocyclic polyester oligomers comprising a structural repeat unit of the formula

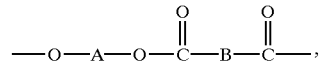

wherein
   A is an alkylene, a cycloalkylene, or a mono- or polyoxyalkylene group, and
   B is a divalent aromatic or alicyclic group; and
   (b) performing anti-solvent precipitation to change the weight percentage of at least one species of the macrocyclic polyester oligomers in the composition.

8. The process of claim 7, wherein the at least one species of the macrocyclic polyester oligomers in step (b) comprises macrocyclic polyester tetramer.

9. The process of claim 7, wherein step (b) comprises using an aliphatic hydrocarbon non-solvent having from about 6 to about 10 carbon atoms.

10. The process of claim 9, wherein the non-solvent comprises heptane.

11. The process of claim 7, wherein step (b) comprises heating a mixture of a non-solvent and the composition to a temperature between about 80° C. and about 120° C.

12. The process of claim 11, wherein step (b) further comprises cooling the mixture to a temperature below about 70° C. to precipitate macrocyclic polyester tetramer.

13. A process for modifying a melting temperature range of a composition comprising macrocyclic polyester oligomers, the process comprising the steps of:

(a) providing a composition comprising at least two species of macrocyclic polyester oligomers, each of the macrocyclic polyester oligomers comprising a structural repeat unit of the formula

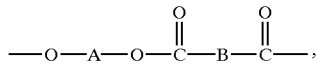

wherein

A is an alkylene, a cycloalkylene, or a mono- or polyoxyalkylene group, and

B is a divalent aromatic or alicyclic group; and (b) changing the weight percentage of at least one species of the macrocyclic polyester oligomers in the composition.

14. The process of claim 13, wherein the at least one species of the macrocyclic polyester oligomers in step (b) comprises a macrocyclic polyester tetramer.

15. The process of claim 13, wherein the upper value of the melting temperature range is reduced.

16. The process of claim 15, wherein the upper value of the melting temperature range is reduced by at least about 15° C.

17. The process of claim 15, wherein the upper value of the melting temperature range is reduced by up to about 70° C.

18. A process for decreasing crystallinity of a composition comprising macrocyclic polyester oligomers, the process comprising the steps of:

(a) providing a composition comprising at least two species of macrocyclic polyester oligomers, each of the macrocyclic polyester oligomers comprising a structural repeat unit of the formula

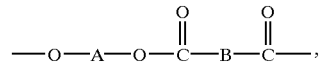

wherein

A is an alkylene, a cycloalkylene, or a mono- or polyoxyalkylene group, and

B is a divalent aromatic or alicyclic group; and (b) performing anti-solvent precipitation to change the weight percentage of at least one species of the macrocyclic polyester oligomers in the composition.

* * * * *